(12) United States Patent
Shen

(10) Patent No.: US 9,785,037 B2
(45) Date of Patent: Oct. 10, 2017

(54) FOLDABLE REFLECTOR

(71) Applicant: SHANGYU LIFEI PHOTOGRAPHIC EQUIPMENT CO., LTD., Shangyu, Zhejiang Province (CN)

(72) Inventor: Lifei Shen, Shangyu (CN)

(73) Assignee: SHANGYU LIFEI PHOTOGRAPHIC EQUIPMENT CO., LTD., Shangyu (CN)

( * ) Notice: Subject to any disclaimer, the term of this patent is extended or adjusted under 35 U.S.C. 154(b) by 0 days.

(21) Appl. No.: 14/879,911

(22) Filed: Oct. 9, 2015

(65) Prior Publication Data

US 2016/0109682 A1   Apr. 21, 2016

(30) Foreign Application Priority Data

Oct. 15, 2014   (CN) ..................... 2014 2 0596934 U

(51) Int. Cl.
*G02B 7/182* (2006.01)
*G03B 15/06* (2006.01)

(52) U.S. Cl.
CPC .................... *G03B 15/06* (2013.01)

(58) Field of Classification Search
CPC ........ G02B 7/182; G02B 5/0808; G02B 5/08; G02B 7/00; G02B 7/1824; G02B 7/1827; G02B 7/1822; G02B 7/198; A61B 1/247; G03B 15/06; G03B 2215/0589; G03B 2215/0525; G03B 17/56; G03B 2215/0528; G03B 17/17; G03B 2215/0521
USPC ................................ 359/871, 882, 881, 883
See application file for complete search history.

(56) References Cited

U.S. PATENT DOCUMENTS

| | | | | |
|---|---|---|---|---|
| 1,662,586 | A * | 3/1928 | Newman ................ | G03B 21/58 160/351 |
| 6,030,087 | A * | 2/2000 | Whittle .................... | F21V 7/18 362/18 |
| 6,322,235 | B1 * | 11/2001 | Strobel .................. | G03B 15/06 362/16 |
| 6,474,021 | B2 * | 11/2002 | Homeyer ................ | A47D 9/005 160/372 |
| 9,051,751 | B2 * | 6/2015 | Ogilvie .................. | E04H 15/005 |

* cited by examiner

*Primary Examiner* — Jade R Chwasz
(74) *Attorney, Agent, or Firm* — Jiwen Chen

(57) ABSTRACT

A foldable reflector includes a frame connected by a plurality of frame strips serially connected, wherein there is a holding rod between two adjacent frame strips and two ends of such holding rod are hinged with corresponding frame strip respectively via corresponding lock pins on the holding rod. The portable reflector in the present invention is made up of rigid frame strips with firm structure and the reflective surface is relatively more even with better reflection effects; the portable reflector in the present invention is foldable, portable and convenient; and the portable reflector in the present invention is provided with easy folding without clipping hands. The pressing block is provided with an exposed surface with bulges to enhance the sense of touch.

4 Claims, 6 Drawing Sheets

FOLDABLE REFLECTOR

The present application claims the priority benefit of Chinese Application No. 201420596934.1, filed Oct. 15, 2014, which is hereby incorporated by reference.

FIELD OF THE INVENTION

The present invention relates to the photographic equipment field, particularly to a foldable reflector.

BACKGROUND OF THE INVENTION

A reflector, as a kind of auxiliary equipment in photographing, is as common as a flash lamp. The use of a reflector based on the environment will make a plain picture look fuller and will reflect good image light and texture. Meanwhile, using it to properly change light in the picture will also achieve good effect in simplifying visual components and highlighting the subject.

An existing reflector with higher popularity is round or oval steel-ring reflector, being light, foldable and portable due to the use of a flexible steel ring covered with reflective fabrics in various colors. However, it is also equipped with such disadvantages as restricted size, poor stability, uneven reflecting surface caused by the unstable shape of the steel ring, as well as the unsuitability for scenes with higher photographing standards.

There is another kind of a square reflector which is a skeleton structure covered with reflective fabrics in various colors. Being different from a steel-ring reflector, the square reflector is provided with a rigid structure and usually with an aluminum alloy supporting skeleton, being able to be easily held and fixed in use. Besides, the reflective surface provided is relatively smoother with better reflective effects.

However, a square reflector cannot be fold like a round or an oval reflector, but needs to be disassembled and stored. Therefore, its practicability is lower and it is not as popular as a round or an oval reflector. If the square reflector can be fold as well, its practicability will be better.

SUMMARY OF THE INVENTION

The present invention relates to a foldable reflector with a simple structure, easy folding and convenient portability.

The technical proposal of the present invention is: a foldable reflector, comprising a frame connected by a plurality of serially connected frame strips, wherein there is a holding rod between two adjacent frame strips and two ends of such holding rod are hinged with a corresponding frame strip respectively via matching lock pins on the holding rod.

There are various lock modes between the lock pins and frame strips and lock pins can act on frame strips via multiple surfaces. It is preferred that frame strips directly connected with the holding rod are first frame strips and others are second frame strips; two ends of the holding rod are hinged with the ends of the first frame strips via bolts and the lock pins are parallel to the bolts.

For lock pins, it is preferred that the lock pin comprises a locking block and a pressing block at two sides of the first frame strip respectively, being connected via a slide bar; and there is a locking groove assorted with the locking block at the end of the first frame strip.

Generally, unlocking lock pins via pressing is achieved based on the lever principle and lock pins thus designed will occupy a larger space and have complicated structure. In the present invention, the locking block and the pressing block are respectively located at two sides of the first frame strip and the locking groove is located at the side close to the locking block. When pressing the pressing block, the locking block will separate from the locking groove.

As mentioned above, two ends of a holding rod are respectively hinged with the corresponding frame strip and achieve swinging and positioning via the corresponding lock pin. When it needs to be folded, one can simultaneously press the pressing blocks corresponding to two lock pins on the holding rod to unlock frame strips at two ends of the holding rod. Here, the pressing block can be two, with one pressing block controlling one lock pin; and the pressing block can also be one, with one pressing block controlling two lock pins at the same time. For pressing blocks, it is preferred that two pressing blocks on the same holding rod are connected and integrated. In other words, two pressing blocks are fixed into one pressing block, which is more convenient in operation.

It is further preferred that there are mounting holes on the holding rod for lock pins and a locking spring in the holding rod for insertion of the locking block into the locking groove; and two ends of the locking spring abut the holding rod and the pressing block respectively.

One end of the locking spring abuts the side of the pressing block facing the locking block and the other end abuts inside of the holding rod. The locking spring's function is to keep the locking block in the locking groove and the locking block can only be separated from the locking groove when one manually pressing the pressing block.

The lock pins will slide in mounting holes on the holding rod. The locking block may expose or not expose from the holding rod, but the pressing block shall expose from the holding rod since it needs to be pressed. When used, the position of the pressing block is not easy to be observed. It is further preferred that the pressing block is provided with an exposed surface with bulges to enhance the sense of touch.

The bulges can be burrs, bumps and raised dots, etc., so long as they can enhance the sense of touch that the pressing block can be found quickly with fingers in use.

It is preferred that the frame is a rectangular; each long side comprises a holding rod and two first frame strips connected with two ends of the holding rod; and the second frame strips serve as short sides of the frame.

The holding rod is set on the long side of the rectangular frame. When folding, one can first fold the long side and then fold the long side towards the short side. In this way, it is very convenient and the size is smaller after folding.

It is preferred that the first frame strips and second frame strips are hinged via right-angle limit connecting pieces. With right-angle limit connecting pieces, the maximum opening angle between the first frame strips and second frame strips is limited to 90° and it is unable to rotate between the first frame strips and second frame strips so long as the long side is a straight line with bending. Therefore, there is no need to put locking pieces on right-angle limit connecting pieces which not only play the role of rotation positioning, but also reduce the folding steps.

It is preferred that the right-angle limit connecting piece comprises an inter-fixed mounting column and a mounting wall; the mounting column is fixed at the end of the second frame strip; the mounting wall is hinged with the first frame strip via a bolt; and the side wall of the first frame strip abuts the end of the mounting column.

It is preferred that the first frame strips and second frame strips are hollow cylinders.

The first frame strips and second frame strips are set as hollow cylinders to reduce the weight of the reflector, as well as users' burden in use and carrying.

Beneficial effects: the portable reflector in the present invention is made up of rigid frame strips with a film structure and the reflective surface is relatively smoother with better reflection effects; the portable reflector in the present invention is foldable, portable and convenient; and the portable reflector in the present invention is provided with easy folding without clipping hands.

DESCRIPTION OF THE EMBODIMENTS

Figure 1:
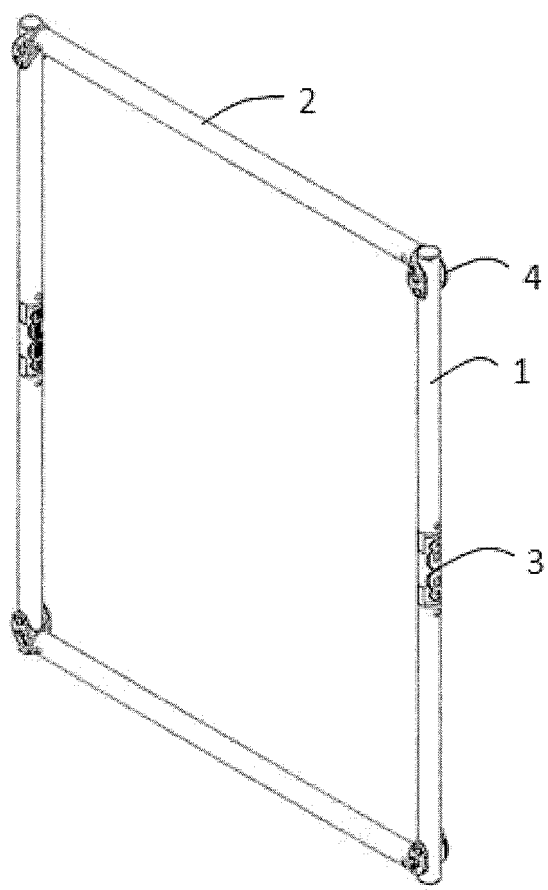
FIG. 1 shows a three-dimensional view of the frame of the foldable reflector in the present invention.
Figure 2:
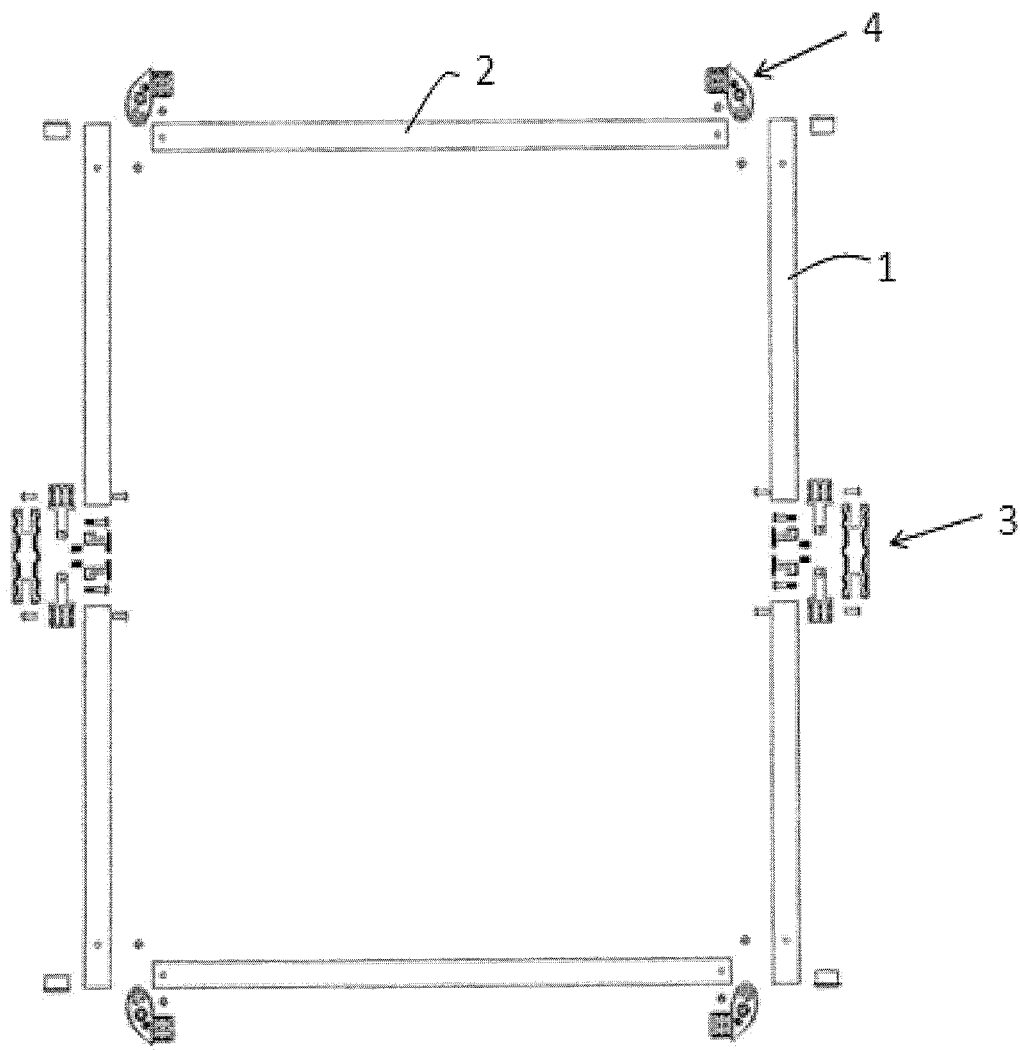
FIG. 2 shows an exploded view of the frame of the foldable reflector in the present invention.

Next, the preferred embodiments of the present invention will be described based on the accompanying drawings.

Many specific details are set forth next so that the present invention can be fully understood. However, the present invention can also be implemented in other different ways. Consequently, the present invention will not be limited to the following preferred embodiments.

As shown in the figure, a foldable reflector comprises four first frame strips 1, two second frame strips 2 and two holding rods 3, forming a rectangular frame; two ends of holding rods 3 connect with two first frame strips 1 to form long sides of the rectangular frame; the second frame strips 2 serve as short sides of the rectangular frame; and the long sides and short sides are hinged via right-angle limit connecting pieces 4.

Among them, the first frame strips 1 and second frame strips 2 are hollow cylinders, so as to reduce the weight of the entire frame. A connecting piece 11 is fixed at the end where the first frame strip 1 hinges with the holding rod 3. One end of the connecting piece 11 is an insertion section 111 to insert into the first frame strip 1 and be fixed with pin 12. The other end of the connecting piece 11 is a rectangular solid hinge section 112. There are two parallel mounting arms 31 at two ends of the holding rod 3 respectively and a mounting groove 311 matched with the size of the hinge section 112 is formed between the two parallel mounting arms 31. The hinge section 112 is mounted in the mounting groove 311 and the hinge section 112 is hinged with the mounting arm 31 via bolt 32 connected with ends of the mounting arm 31.

There is a lock pin 33 on the holding rod 3 to lock the hinge section 112, so as to guarantee that the holding rod 3 and two first frame strips 1 connected with two ends of the holding rod 3 remain on the same straight line during normal use.

Being parallel to the bolt 32, the lock pin 33 takes on a J shape and comprises a locking block 331 at one side of the hinge section 112, a pressing block 332 at the other side of the hinge section 112, as well as a slide bar 333 connecting the locking block 331 and the pressing block 332. At the side of the hinge section 112 close to the locking block 331, there is a locking groove 113 assorted with the locking block 331.

There are mounting holes (not indicated in the drawings) for lock pins 33 on the holding rod 3, as well as a locking spring 34 for the insertion of the locking block into the locking groove 113 in the holding rod 3. At the side where the pressing block 332 faces the locking block 331, there is a bump 334 and the locking spring 34 is fixed on the bump 334. One end of the locking spring 34 abuts the pressing block 332 and the other end abuts inside the holding rod 3. By pressing the pressing block 332, the locking spring 34 indirectly presses the locking block 331 towards the locking groove 113 and the locking block 331 inserts into the locking groove 113. Then, it is unable to rotate between the holding rod 3 and the first frame strip 1. By pressing the pressing block 332, the locking block 331 can be separated from the locking groove 113 and the holding rod 3 and the first frame strip 1 can be rotated.

There are two sets of matched lock pins and locking grooves on the holding rod 3. To make the holding rod 3 rotate with the first frame strips at both ends at the same time and achieve folding, it is required to press two pressing blocks 332 on the holding rod 3 at the same time. To avoid clipping hands when folding, the length of the holding rod 3 shall be about the same with the width of a human hand. There is a holding rod 3 on two long sides of the rectangular frame respectively and both hands shall hold two holding rods 3 and press the pressing blocks 33 at the same time so as to fold long sides of the rectangular frame. The pressing block 33 exposes from the holding rod 3 and keeps level with the surface of the holding rod 3. There are burrs 335 on the surface of the pressing block 3 to enhance the sense of touch so that the pressing block 33 can be found quickly with fingers during use.

The long sides and short sides of the rectangular frame are hinged via right-angle limit connecting pieces 4. In other words, the first frame strips 1 and second frame strips 2 are hinged with right-angle limit connecting pieces 4. A right-angle limit connecting piece comprises an inter-fixed mounting column 41 and a mounting wall 42. The mounting column 41 is inserted into the end of the second frame strip 2 and fixed with the pin 411. There are two mounting walls 42 on each right-angle limit connecting piece 4 and the distance between two mounting walls 42 is the same as that of the first frame strip 1. The ends of the first frame strip 1 are hinged between the mounting walls 42 via the bolts 421. When unfolding the rectangular frame, the side wall of the first frame strip 1 abuts the end of the mounting column 41. Under the action of the right-angle limit connecting piece 4, the first frame strips 1 and second frame strips 2 can only rotate within the scope of 90°.

Figure 5:
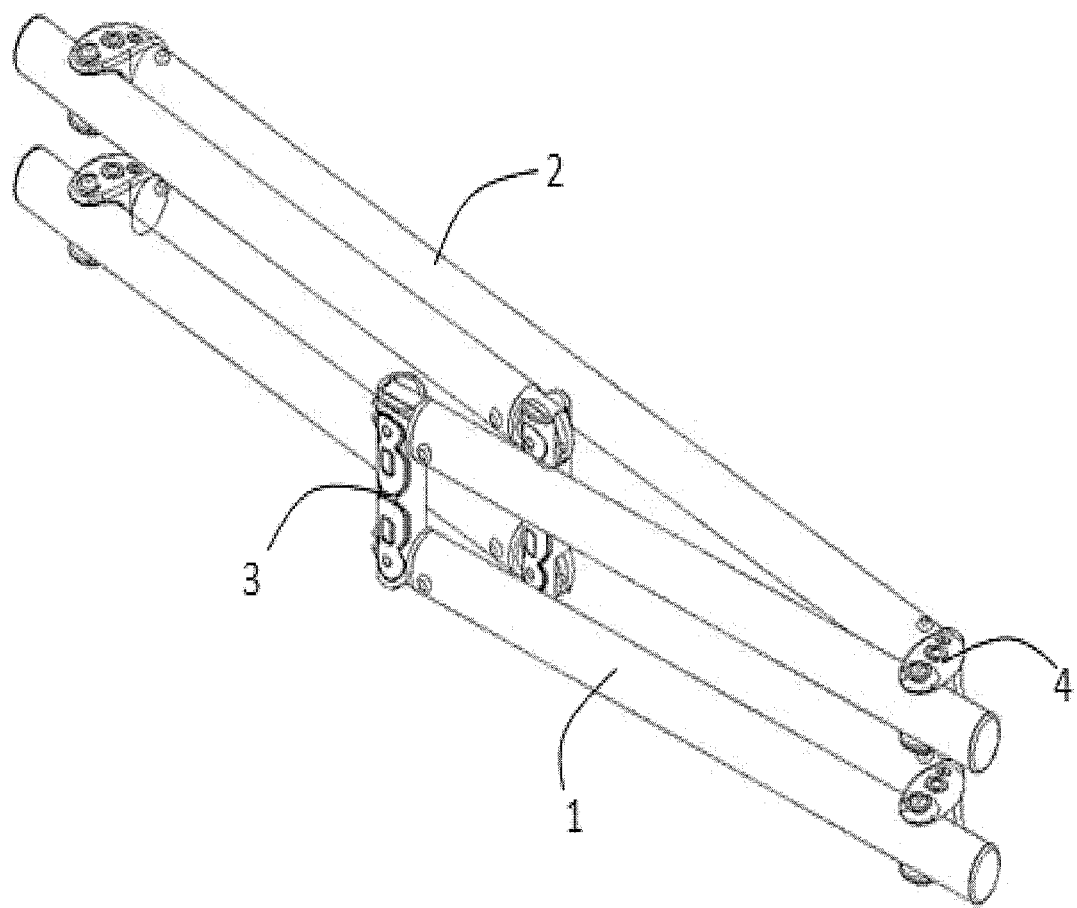
FIG. 5 shows a schematic view of the frame of the foldable reflector in the present invention after folding.

To make it easier for one to understand how the rectangular frame is folded; the folding process of frame in this embodiment is described. Taking the plane where the rectangular frame is unfolded as the datum plane, supposing that the holding rod 3 remains still and a user pressing the pressing block 33 at the same time, the first frame strips 1 and second frame strips 2 can be folded along the direction perpendicular to the datum plane so that two second frame strips 2 approach each other. Then, supposing that second frame strips 2 remain still, the final effect after folding is as shown in FIG. 5 when folding the holding rod 3 and first frame strips 1 towards the center of second frame strips 2.

Figure 3:
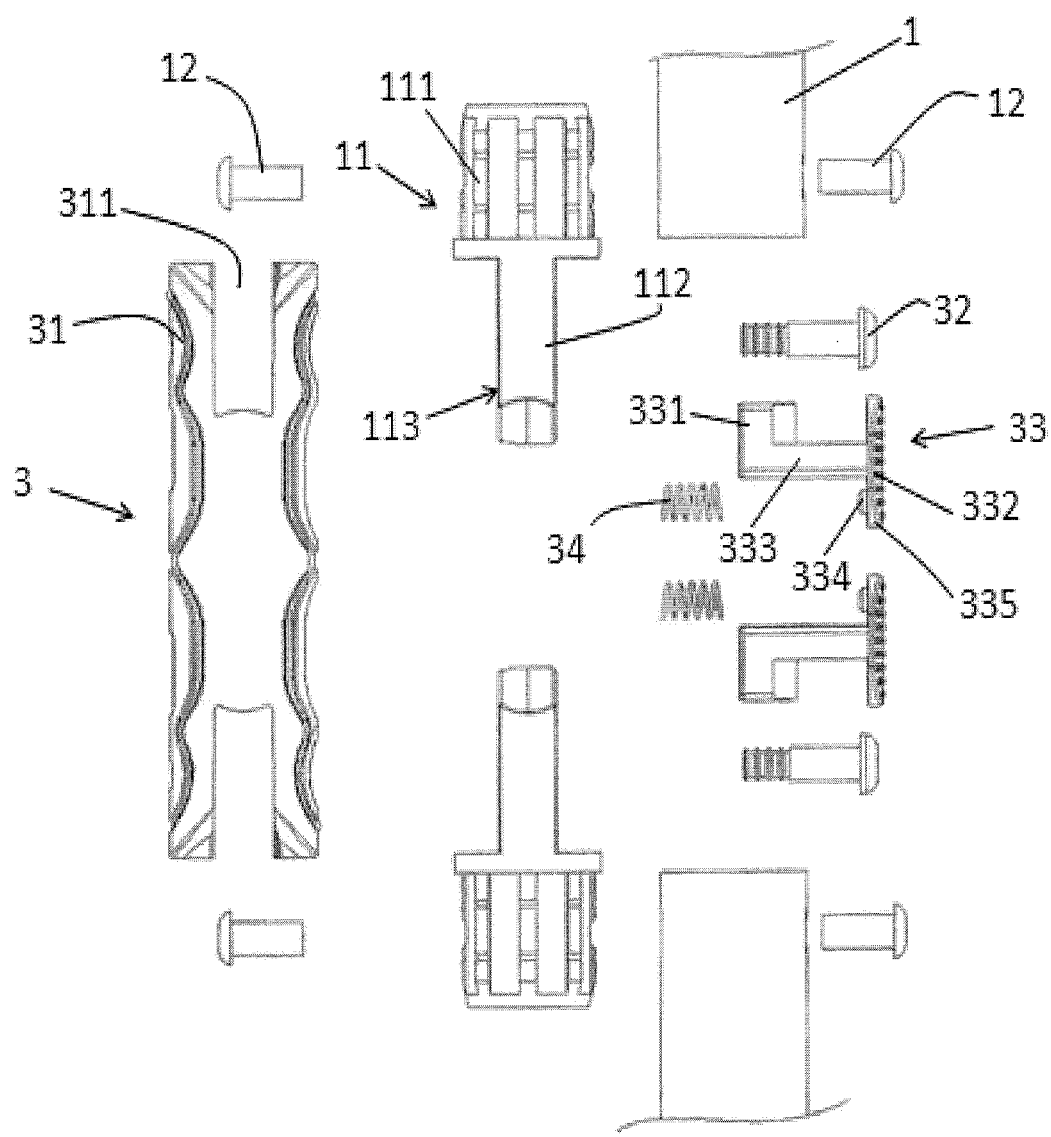
FIG. 3 shows a structural schematic view of the holding rod on the frame of the foldable reflector in the present invention.
Figure 4:
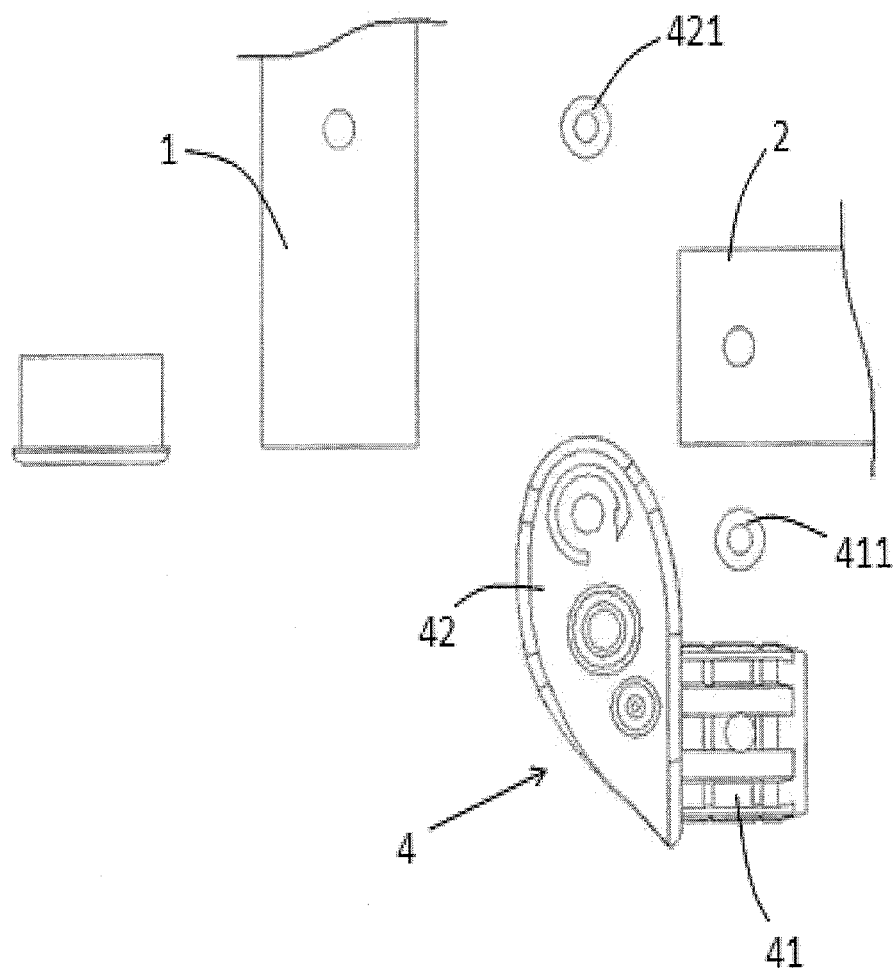
FIG. 4 shows a structural schematic view of the right-angle limit connecting piece on the frame of the foldable reflector in the present invention.
Figure 6:
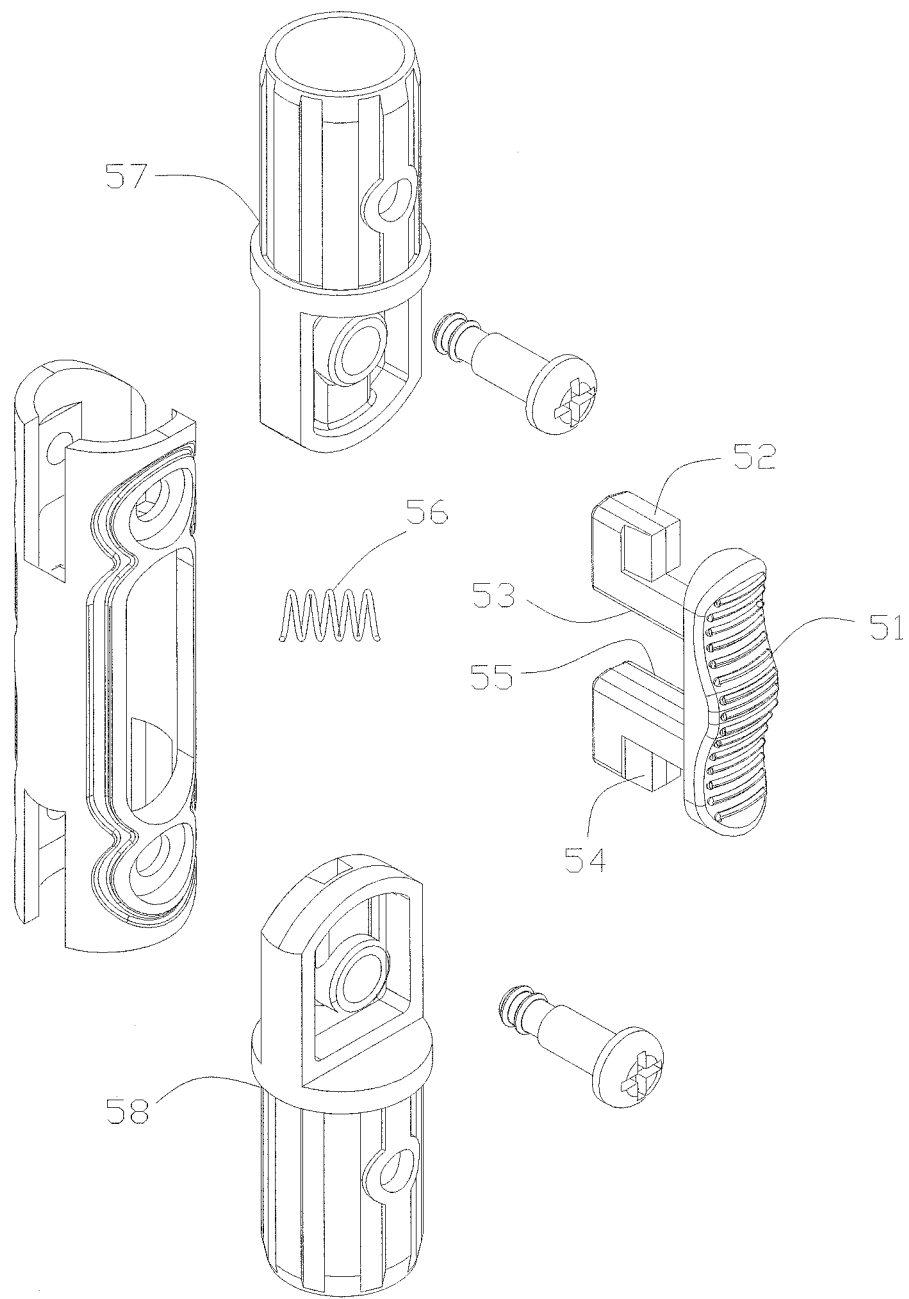
FIG. 6 shows a structural schematic view of another kind of holding rod on the frame of the foldable reflector in the present invention.

As shown in FIG. 6, it is another kind of structure of the holding rod that is different from the holding rod 3 as shown in FIG. 3 with the major difference on the quantity of the pressing block. In FIG. 6, the locking block 52 connects with the pressing block 51 via the slide bar 53 and the locking block 54 connects with the pressing block 51 via the slide bar 55. The slide bar 53 is parallel to the slide bar 55 with an interval and a locking spring 56 between them. Two ends of the locking spring 56 abut the holding rod and the pressing block 51 respectively, and there is a corresponding bulge (not indicated in the drawings) at the abutting position between the pressing block 51 and the locking spring 56 to fix ends of the locking spring 56. The locking block 52 and the locking block 54 match with locking groove of the connecting piece 57 and the connecting piece 58 respectively. Before folding the frame of the reflector, under the action of the locking spring 56, the locking block 52 and the locking block 54 are stuck in corresponding locking groove. By pressing the pressing block 51, both the locking block 52 and the locking block 54 will separate from their respective locking groove at the same time and easily achieve the folding of the reflector frame with more convenient operation.

The above mentioned are only preferred embodiments of the present invention without any restriction. For those skilled in the art, the present invention can be subject to multiple modifications and changes. Therefore, any modification, equal substitute and improvement, etc. made within the spirits and principles of the present invention shall be within the protection scope of this present invention.

The invention claimed is:

1. A foldable reflector, comprising a frame connected by a plurality of frame strips that are serially connected, wherein there is a holding rod between two adjacent frame strips and two ends of the holding rod are hinged with corresponding frame strips respectively via associated lock pins on the holding rod;
    wherein the frame strips directly connected with the holding rod are first frame strips and other frame strips are second frame strips; two ends of the holding rod are rotatably hinged with the ends of the first frame strips via bolts and the lock pins are parallel to the bolts;
    wherein the frame is rectangular; each long side comprises a holding rod and two first frame strips connected with two ends of the holding rod; and the second frame strips serve as short sides of the frame;
    wherein the lock pin comprises a locking block and a pressing block at two sides of the first frame strip respectively, the locking block and the pressing block are connected via a slide bar; and there is a locking groove engaging with the locking block at the end of the first frame strip;
    wherein there are mounting holes on the holding rod for the lock pins and a locking spring in the holding rod for insertion of the locking block into the locking groove; two ends of the locking spring abut the holding rod and the pressing block, respectively, such that when the pressing block is pressed, the locking block is separated from the locking groove, and first strips are rotatable relative to the holding rod;
    wherein the first frame strips and the second frame strips are hinged via right-angle limit connecting pieces;
    wherein the right-angle limit connecting piece comprises an inter-fixed mounting column and a mounting wall; the mounting column is fixed at an end of the second frame strip; the mounting wall is hinged with the first frame strip via a bolt; and a side wall of the first frame strip abuts an end of the mounting column;
    wherein the first frame strips and second frame strips are hollow cylinders; and
    wherein the frame is adapted to be folded as follows: a plane of the frame when unfolded being used as a datum plane, the holding rod being kept still and the pressing block being pressed, the first frame strips and second frame strips are folded along a direction perpendicular to the datum plane so that two second frame strips approach each other; then second frame strips being kept still, the holding rod and first frame strips are folded towards centers of second frame strips.

2. The foldable reflector according to claim 1, wherein two pressing blocks on the same holding rod are connected and integrated.

3. The foldable reflector according to claim 1, wherein the pressing block is provided with an exposed surface with bulges to enhance sense of touch.

4. The foldable reflector according to claim 1, wherein two pressing blocks on the same holding rod are connected and integrated, wherein the pressing block is provided with an exposed surface with bulges to enhance sense of touch and wherein the locking block is in a J shape.

* * * * *